(No Model.)
J. MOORE.
DRINKING TROUGH FOR ANIMALS.
No. 316,639. Patented Apr. 28, 1885.
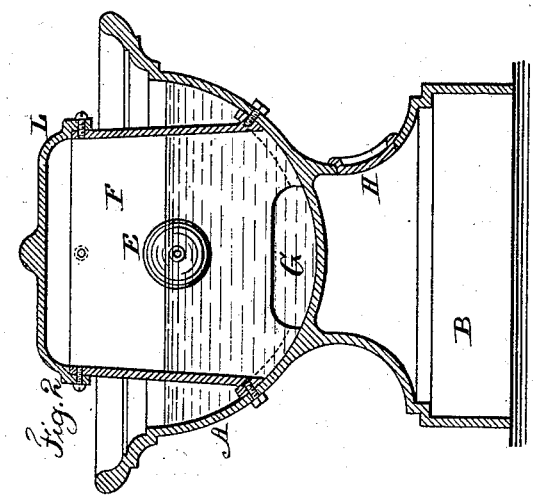
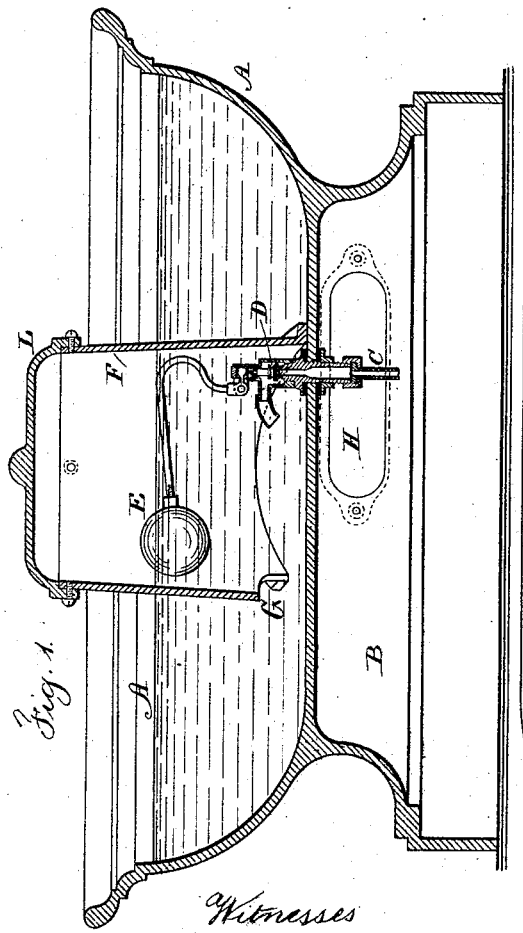
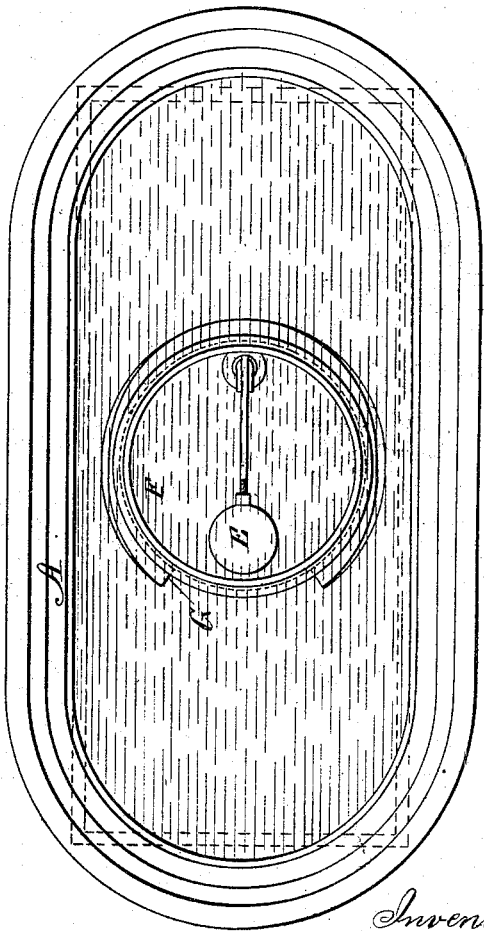

UNITED STATES PATENT OFFICE.

JONATHAN MOORE, OF BROOKLYN, NEW YORK.

DRINKING-TROUGH FOR ANIMALS.

SPECIFICATION forming part of Letters Patent No. 316,639, dated April 28, 1885.

Application filed December 10, 1884. (No model.)

*To all whom it may concern:*

Be it known that I, JONATHAN MOORE, of Brooklyn, in the county of Kings and State of New York, have invented an Improvement in Drinking-Troughs for Animals, of which the following is a specification.

Drinking-troughs for horses have been made with a ball-cock to the water-pipe, by which the water has been maintained at nearly a uniform height. This ball-cock is necessarily inclosed for protecting it against injury. The troughs of this character have usually been made of wood, with the inclosure for the ball-cock at one end. This prevents easy access to the water all round the trough, and exposes the trough to injury from the harness and poles when the horses are near the inclosed end and reach over the same to the water. Drinking-troughs have been made of iron with a standing supply-pipe, and also a standing overflow, but in many places the same are not permitted on account of wasting the water.

My invention relates to the combination, with the water-trough, of a supply-pipe, cock, and float, near the middle of the water-space, with a case to inclose and protect the cock and float, and with a movable cover to the case and an opening at the bottom of the case between the same and the trough, so that the drinking-trough has a free or open water-space all around the case. The case does not get in the way of the animals, and the fresh water passes up from the bottom of the case so as to float any saliva or foreign matter and cause the same to run off, where an overflow is provided, thus keeping the water clean and giving free access for the animals to the water.

In the drawings, Figure 1 is a vertical section longitudinally. Fig. 2 is a section transversely of the trough, and Fig. 3 is a plan with the cover of the case removed.

The trough is preferably of an oval shape, made of cast-iron, and of an ornamental form. The particular shape represented is found to be very convenient; but I do not limit myself in this particular.

The trough is made with the basin portion A and the hollow base B.

The water-pipe C is passed up through the bottom of the basin A, near the middle thereof, and it is provided with a cock or valve, D, and a lever and float, E, for opening or closing the valve. The parts are constructed so that the supply-valve D will be closed, or nearly so, when the trough is full. It is preferable to allow the water to flow over the basin at one edge. If this is done, the valve should be nearly closed when the water runs over.

In order to protect the valve and float I provide a case, F, bolted firmly to the bottom of the trough, or cast with the same, and there are one or more openings, G, at the bottom of the casing, between the same and the inner surface of the bottom of the trough, so as to allow water to pass freely from the casing into the trough.

The casing rises above the surface of the water, and is provided with a removable cap, L, to give access to the float and valve. It is usually preferable to provide an opening, H, at one side of the base for the purpose of giving access to the coupling for the water-pipe below the basin of the trough, and also for turning the water off by a stop-cock to prevent freezing in winter time.

I do not claim a drinking-fountain having a float to actuate the valve, nor a metallic case inclosing the cock and float, as these have been used.

I claim as my invention—

The metallic basin forming a horse-trough, and a supply water-pipe, cock, and float near the middle thereof, in combination with a separate case open at the bottom and notched at one side and surrounding the cock and float, and a removable cover for the case, substantially as set forth.

Signed by me this 3d day of December, A. D. 1884.

JONN. MOORE.

Witnesses:
C. A. PECK,
ALFD. MASFORD.